Sept. 22, 1959          H. HURVITZ          2,905,893

VISUAL INDICATORS

Filed May 14, 1954

INVENTOR
Hyman Hurvitz

United States Patent Office 2,905,893
Patented Sept. 22, 1959

2,905,893

VISUAL INDICATORS

Hyman Hurvitz, Washington, D.C., assignor to the United States of America as represented by the Secretary of the Air Force Application May 14, 1954, Serial No. 429,784

6 Claims. (Cl. 324—77)

The present invention relates generally to visual frequency indicators, and more particularly to devices for indicating the frequency of a signal, or the simultaneous frequencies of a plurality of signals, by translating the signal or signals into ultrasonic waves, and causing the ultrasonic waves to impinge on triboluminescent material or elements.

In my prior application for patent, Serial No. 238,460, filed July 25, 1951, now abandoned, I have disclosed a system for displaying visually the frequency content of a band of frequencies. The system basically involves the generation of a band of ultrasonic waves, corresponding in frequencies with the first mentioned frequencies, diffracting the ultrasonic waves, and causing the diffracted ultrasonic waves to impinge on triboluminescent crystalline material, thereby causing the latter to glow.

In accordance with a first feature of the present invention the ultransonic waves are not diffracted, but are caused to impinge simultaneously on a plurality of pellets of triboluminescent material, which are separately mechanically resonant to different ones of the frequencies, whereby that pellet will glow with greatest intensity which is resonant to a frequency present in the band of ultrasonic waves.

In accordance with a second feature of the invention the ultrasonic waves are diffracted in different paths as a function of wave frequency, and pellets of triboluminescent material are placed in the possible paths of the waves. Each pellet is designed to be resonant to the frequency of the waves which is diffracted to the path of that pellet, and the pellets are resonant in order to enhance the luminosity attainable in response to a predetermined ultrasonic energy level.

In accordance with a further feature of the invention the resonant visual elements consist of piezo-electric crystals, coated with triboluminescent material.

In accordance with another feature of the invention resonant elements are not employed, but only triboluminescent powder, the novel feature of the invention consisting of the impregnation with the triboluminescent powder of a cellular pad absorbent to ultrasonic waves, so that maximum ultrasonic energy may be absorbed by the powder due to multiple reflection of the waves within the pad.

Another feature of the invention concerns itself with novel devices for the diffracting of ultrasonic waves by means of ultrasonic waves. More specifically, a first ultrasonic transducer transmits ultrasonic waves transversely to the path of waves transmitted by a second transducer, and thereby effectively produces a diffraction grating in the path of the waves produced by the second transducer. The grating is present in terms of regions of relative rarefaction and compression of the medium in which the waves are present, which produce relatively different phase delays, respectively, in the waves produced by the second transducer.

It is a particular advantage of the last mentioned embodiment of the invention to provide a grating of considerable thickness in a simple manner, and which permits simple control of the spacings of the apertures of the grating, and of the phase delays introduced thereby.

The above and still further features, objects and advantages of the present invention will become apparent upon consideration of various specific embodiments thereof, especially when taken in conjunction with the accompanying drawings, wherein.

Figure 4:
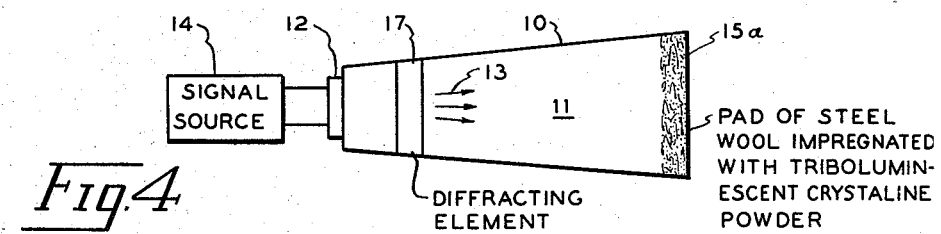
Figure 5:
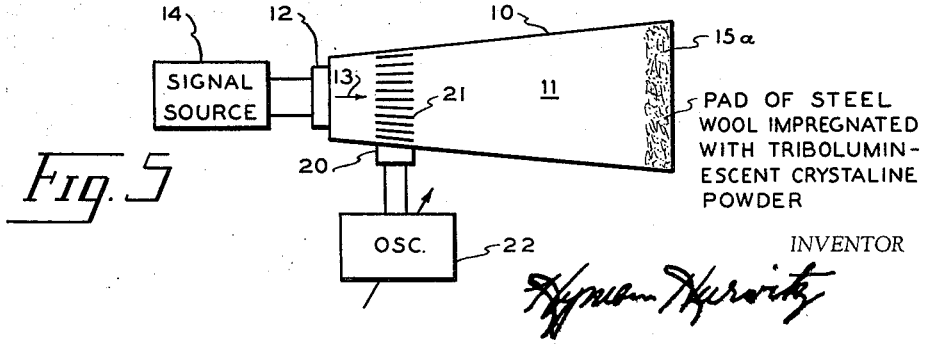

Figure 4 is a view in side elevation of a modification of the present invention wherein a plurality of ultrasonic signals of different frequencies are diffracted respectively in different paths, and wherein an absorbent pad capable of completely absorbing the waves is interposed in the paths, and is impregnated with triboluminescent powder, and Figure 5 is a view in side elevation of a device for diffracting ultrasonic waves by means of a grating generated by an ultrasonic transducer.

Figure 1:
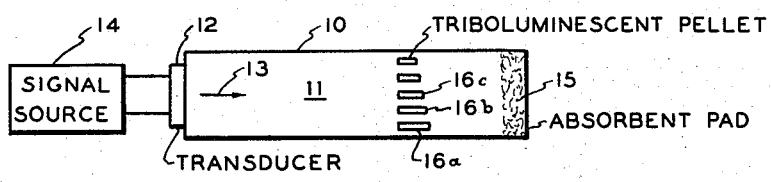
Figure 1 is a view in side elevation of a first embodiment of the present invention, embodying a plurality of triboluminescent pellets, of different resonant frequencies, located in the path of an ultrasonic wave.

Referring now more particularly to Figure 1 of the accompanying drawings, the reference numeral 10 denotes a container for an ultrasonic medium 11, such as mercury, light oil, water or the like (a solid medium such as Lucite, quartz, Pyrex glass, or the like, may be employed if desired, in which case no container is required). A transducer 12 radiates ultrasonic waves into the medium 11, in the direction of the arrow 13. The transducer is supplied with electrical energy by a suitable signal source 14, such as a radio, radar or sonar receiver, a tunable signal generator, or the like, capable of providing one or more frequencies, or a band of frequencies, within a frequency spectrum. Suitable frequencies for use in the present application may range from about .25 mc. to about 500 mc. The ultransonic medium 11 is terminated by a pad 15 of material capable of absorbing ultrasonic waves, such as steel wool, porous and soft rubber, or the like. The pad 15 prevents reflection of ultrasonic energy from the remote end of the container 10. The structure as defined to this point is conventional.

In accordance with the present invention a plurality of pellets 16a, 16b, 16c, . . ., are provided, each fabricated essentially of a triboluminescent powder with a suitable binder, and each having a dimension in the direction of the vibration of the ultrasonic wave which renders the pellet resonant to a different single frequency present in the frequency band transmitted by the transducer 12. Accordingly, the pellets 16a, 16b, 16c, . . . will glow selectively in accordance with the ultrasonic frequencies present in the medium 10. On the assumption that the medium 10 is a liquid, the ultrasonic waves present are of the longitudinal, and not of the transverse or shear type. If the medium 10 is solid, either wave type may be present, and the pellets 16 may be spherical, and have diameters selected to render them resonant in every direction. Any desired number of pellets may be employed, and the pellets may be arranged in order of increasing frequency, to simplify their identification.

Figure 2:
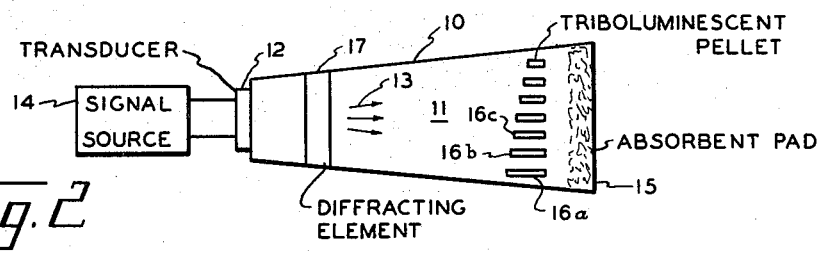
Figure 2 is a view in side elevation of a plurality of triboluminescent pellets each resonant to a different ultrasonic frequency, and each located in the path of a diffracted ultrasonic wave having a frequency equal to the resonant frequency of the pellet.

In the embodiment of my invention illustrated in Figure 2 of the accompanying drawings, the ultrasonic waves injected in the medium 11 by the transducer 12 are diffracted in different directions in accordance with wave frequency by a suitable diffracting element 7, such as a diffraction grating, ultrasonic prism or the like, in a manner which may be per se conventional. The several pellets 16a, 16b, 16c, . . ., may then each have a length in the direction of the force field of ultrasonic waves which renders the pellet resonant to the particular frequency of the wave energy which impinges on it.

Figure 3:
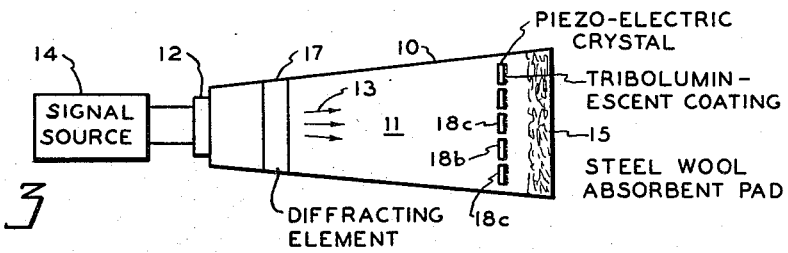
Figure 3 is a view in side elevation, illustrating a modification of the system of Figure 2 wherein the pellets of Figure 2 are replaced by piezo-electric crystals coated with triboluminescent powder.

In the embodiment of my invention illustrated in Figure 3 of the accompanying drawings, the pellets 16a, 16b, 16c, . . . of Figure 2 are replaced by resonant piezo electric crystals, 18a, 18b, 18c, . . . coated with triboluminescent powder, in any convenient manner. Similar elements may be employed in the embodiment of my invention illustrated in Figure 1 of the accompanying drawings.

In the embodiment of my invention illustrated in Figure 4 of the accompanying drawings, the terminating and absorbent pad 15a is impregnated with triboluminescent crystals, in order that the path of waves diffracted by the diffracting element 17 may be visually indicated. Since the pad 15a absorbs all the energy of the ultrasonic wave to which it is subjected, by multiple reflection, a considerable portion of that energy reaches the triboluminescent particles during successive reflections from one particle to another of the pad.

In the embodiment of my invention illustrated in Figure 5 of the accompanying drawings, a second transducer 20 is provided which transmits ultrasonic waves 21 to the medium 11 transversely of the direction in which waves are transmitted by the transducer 12, and which is represented by the arrow 13. The waves 21 constitute, at a given instant of time, a pattern of alternate rarefactions and compressions of the medium 11, extending transversely of the direction in which travel the waves transmitted by transducer 12. This pattern represents effectively a diffraction grating for the latter waves and causes the latter waves to be diffracted in different directions, in dependence on the frequencies of the waves.

The transducer 20 may be driven by the output of an oscillator 22 of variable frequency and amplitude, and of sine wave, square wave, or other suitable wave shape, and its frequency should be such as to provide a wave length greater than the wave length to be diffracted, and preferably several times greater.

The diffraction grating in the form of a pattern of ultrasonic waves (traveling or standing), may be employed as the diffracting element of Figures 1-4, if desired, and provides a convenient form of readily variable grating.

In Figure 4 the function of the absorbent pad 15a, of steel wool or the like, is to cause the ultrasonic energy impinging thereon to travel a devious path within the pad 15a, with multiple reflections caused by the material of the pad, until all the energy is absorbed in the pad. Thereby, a maximum number of impingements of the energy on the triboluminescent crystals is accomplished, and thereby the total luminous energy produced is greatly increased. The relative proportions of absorbent material and of triboluminescent material may be varied over a wide range, and in the limit the triboluminescent material alone may be employed in a layer of sufficient depth, and in a sufficiently dispersed form, effectively to form of itself an absorbent element for ultrasonic waves, which is luminescent in response to the waves.

Suitable triboluminescent materials are listed at page 171 of the book "Luminescence of Solids," published by John Wiley in 1950, whose author is Leverenz. Included are tetr. $Zn_nF_2$: Mn, Cub. ZnS: Mn; $Ca_2P_2O_7$: Dy.

While I have described and illustrated various specific embodiments of my invention, it will be clear that variations and modifications of these embodiments may be resorted to without departing from the true spirit and scope of the invention, as defined in the appended claims.

What I claim is:

1. A device for indicating the frequency of an ultrasonic wave comprising a medium for said ultrasonic wave, and at least one element mechanically resonant to said ultrasonic wave, said element immersed in said medium in the path of said wave and comprising triboluminescent material.

2. A device for indicating the presence of an ultrasonic wave of predetermined wave length, said wave traveling in an ultrasonic medium, comprising a triboluminescent element resonant to said wave and immersed in said medium in the path of said wave.

3. A device for visually indicating the presence of an ultrasonic wave of predetermined wave length, comprising a piezo-electric crystal resonant to said wave length, and a mass of triboluminescent material in contact with said piezo-electric crystal.

4. An absorbent device for ultrasonic waves, comprising a pad of cellular material substantially completely absorbent of said waves in the path of said waves, said cellular material including triboluminescent material dispersed substantially therethrough.

5. A spectrum analyzer for ultrasonic waves, comprising, a source of a band of ultrasonic waves, means for transmitting said waves into an ultrasonic medium, and a plurality of resonant triboluminescent elements in the paths of said waves, said elements each resonant to a different one of said waves.

6. The system in accordance with claim 5 wherein is provided means for diffracting said waves into different paths, each of said different paths being a function of the frequency of the wave taking the path, and wherein said elements are each located in the path of a wave to which it is resonant.

References Cited in the file of this patent

UNITED STATES PATENTS

| | | |
|---|---|---|
| 1,616,639 | Sprague | Feb. 8, 1927 |
| 1,951,669 | Ramsey | Mar. 20, 1934 |
| 2,154,127 | Hallmann | Apr. 11, 1939 |
| 2,416,338 | Mason | Feb. 25, 1947 |
| 2,418,964 | Arenberg | Apr. 15, 1947 |
| 2,423,459 | Mason | July 8, 1947 |
| 2,449,880 | Cox | Sept. 21, 1948 |
| 2,643,286 | Hurvitz | June 23, 1953 |

OTHER REFERENCES

Electronic Engineering, December 1946, pp. 361–367, article by Sommer.